United States Patent [19]

Zweigle

[11] 4,024,328

[45] May 17, 1977

[54] METHOD FOR ALKYLATING AMINOMETHYLACRYLAMIDE POLYMERS

[75] Inventor: Maurice L. Zweigle, Midland, Mich.

[73] Assignee: The Dow Chemical Company, Midland, Mich.

[22] Filed: Oct. 1, 1975

[21] Appl. No.: 618,650

[52] U.S. Cl. .................................. 526/54; 210/54; 526/23
[51] Int. Cl.² .......................................... C08F 8/02
[58] Field of Search ...................... 210/54 R, 54 C; 260/89.7 N, 89.7 S; 450/618; 526/54

[56] References Cited

UNITED STATES PATENTS

| | | | |
|---|---|---|---|
| 3,166,540 | 1/1965 | Melamed et al. | 260/89.7 N |
| 3,758,445 | 9/1973 | Cohen et al. | 260/89.7 N X |
| 3,859,212 | 1/1975 | Smalley et al. | 210/54 C |
| 3,897,333 | 7/1975 | Field et al. | 260/89.7 N X |

Primary Examiner—William F. Hamrock
Attorney, Agent, or Firm—Michael Jenkins

[57] ABSTRACT

In the preparation of polyquaternary ammonium salts by alkylation of a dialkylaminomethylacrylamide polymer with an alkyl halide in an aqueous solution of the polymer, more rapid and complete alkylation is obtained when the reaction is carried out in an acidic medium containing a lower alkanol such as methanol.

9 Claims, No Drawings

METHOD FOR ALKYLATING AMINOMETHYLACRYLAMIDE POLYMERS

BACKGROUND OF THE INVENTION

British Patent 887,900 and U.S. Pat. No. 3,256,140 teach the usefulness of various quaternary aminomethyl substituted acrylamide polymers for several purposes in the manufacture of paper. These references show the preparation of such polymers by the homopolymerization or copolymerization of monomeric quaternary aminomethyl substituted acrylamide or methacrylamide. This process requires the preparation and isolation of the expensive quaternary monomer and does not lend itself to commercial practice. Further, the quaternary monomer does not lend itself to the preparation of the relatively high molecular weight acrylamide polymers, which have been found desirable for use as flocculating agents.

U.S. Pat. No. 3,859,212 teaches that certain acrylamide polymers containing aminomethyl groups have desirable properties as flocculating agents and are rendered more stable by converting the aminomethyl groups to the quaternary form. However, it has been found that the methods for preparing the polyquaternary ammonium compounds, as taught in the prior art, are not adapted to commercialization. Thus, for example, when quaternization was attempted at practical concentrations of polymer in an alkaline aqueous medium the polymer formed a thick gel prior to completion of the quaternization reaction, said gel being so viscous as to render it difficult or impossible to apply same as a flocculating agent or paper treating chemical. On the other hand, when it was attempted to carry out the reaction at an acidic pH in aqueous medium it was found that the reaction proceeded so slowly that little or no product could be obtained within a reasonable time.

It would therefore be desirable and is an object of the present invention to provide a method for preparing quaternary ammonium derivatives of acrylamide polymers rapidly and in good yield.

SUMMARY OF THE INVENTION

In accordance with the present invention it has been discovered that the alkylation of Mannich bases prepared from acrylamide polymers can be carried out rapidly and smoothly in an acidic aqueous medium provided a small catalytic amount of an alkanol of from 1 to 4 carbon atoms is added to the reaction medium. It is among the advantages of this novel method that substantially all of the amino groups in the Mannich base can be readily converted to the quaternary ammonium form. It is a further advantage that the reaction proceeds in the presence of the catalytic alkanol without the formation of thick gels in the reaction product.

In carrying out the reaction the N-dialkylaminomethyl derivative of polyacrylamide, employed as a starting material, is generally prepared in a relatively dilute aqueous solution and such products as commercially available are generally strongly alkaline having a pH in the range of from 10 to 11. Thus, it will generally be necessary to add an acid, such as a mineral acid or an organic acid, to the solution of starting material to adjust the pH thereof to a range of from 2 to about 6.5, preferably from about 4 to about 6.5 prior to carrying out the alkylation reaction. Optionally, from about 5 to 10 percent by weight of a neutral salt, such as sodium chloride or sodium sulfate, may be added to the reaction mixture to reduce the viscosity thereof. A catalytic amount of an alkanol containing from 1 to 4 carbon atoms is then added to the reaction mixture and the latter is heated to a reaction temperature and contacted with the desired amount of alkylating agent. The preferred alkylating agents for use in the invention are alkyl chlorides and preferably primary alkyl chlorides, such as methyl chloride, ethyl chloride, normal propyl chloride, normal butyl chloride or isobutyl chloride. For ease of handling and ready reactivity methyl chloride and ethyl chloride are the preferred alkylating agents. However, because of the low boiling points of these materials, it is necessary to carry out the reaction in a pressure vessel under elevated pressure when employing methyl chloride or ethyl chloride.

The amount of polymer to be employed in the reaction mixture will vary depending upon the molecular weight of the polymer concerned. Thus, for example, with the polyacrylamides having molecular weights of from about 100,000 to 300,000 the polymer solids in the reaction mixture may be from about 20 percent by weight up to about 40 percent by weight. On the other hand with polyacrylamides having molecular weights of 1,000,000 or more it is generally desirable to employ a solution of 5 percent by weight or less of the polymer in order to avoid excessive viscosity in the reaction medium. Only a small catalytic amount of the alkanol is required and this amount can be predetermined by a trial reaction. In general good results have been obtained when employing from about 5 to 15 percent by weight, preferably about 10 percent by weight, of alkanol based on the weight of polymer in the reaction mixture. Excessive amounts of alkanols can precipitate the polymer from the aqueous solution and it is therefore generally desirable to employ no more than about 10 percent of alkanol by weight based on the total weight of the reaction mixture. Any desired amount of alkylating agent can be employed depending upon the degree of quaternization required. In most cases, it is preferred to employ a slight excess of alkylating agent over the stoichiometric amount required to convert all the aminomethyl groups in the starting polymer to the quaternary form.

The reaction may be carried out at temperatures of from about 40° C up to the boiling point of the reaction mixture and is preferably carried out at a temperature in a range of from about 60° to 70° C.

The following examples illustrate the invention but are not to be construed as limiting the same.

EXAMPLE 1

The N-dimethylaminomethyl-polyacrylamide employed as a starting material was prepared by the Mannich reaction from a polyacrylamide, having a molecular weight of about 300,000 and having about 5 percent of its original carboxamide groups hydrolyzed to sodium carboxylate groups, said reaction being carried out by heating an aqueous solution of the polyacrylamide with stoichiometric amounts of formaldehyde and dimethylamine to convert about 90 percent of the amide groups to the N-dimethylaminomethyl form.

300 Grams of an aqueous solution of this N-dimethylaminomethyl derivative of polyacrylamide containing 78 grams (0.72 mole) of the latter was placed in a pressure vessel equipped with a stirrer and gas inlet and 15 grams of sodium chloride and 8 grams of methanol were dissolved therein. The resulting solution was acidified to pH 6.3 with sulfuric acid, the pressure vessel was closed and 80 grams of methyl chloride was added. The reaction vessel and contents were heated at temperatures of 62°-65° C for a period of about 3 hours. The pressure vessel was vented, cooled to room temperature and opened. The product was a clear liquid, no more viscous than the starting polymer solution, and did not gel on storage. Titration of an aliquot of the product showed that substantially all of the dimethylamino groups in the starting polymer had been converted to trimethyl-quaternary-ammonium chloride groups. A dilute solution of the product was found to be an excellent flocculating agent, for example, on raw sewage solids.

When the foregoing procedure was carried out in exactly similar fashion except that no methanol was added to the reaction mixture, the quaternization reaction did not occur to a detectible extent.

EXAMPLE 2

A polyacrylamide, having a molecular weight in the range of one to two million and having about 7 percent of its original carboxamide groups hydrolyzed to carboxyl groups was dissolved in water and reacted with formaldehyde and dimethylamine to produce an N-dimethylaminomethyl derivative having about 90 percent of its amide groups bearing the N-dimethylaminomethyl moiety. To 300 grams of the resulting solution, containing 15 grams (about 0.14 mole) of the N-dimethylaminomethyl acrylamide polymer, were added 15 grams of sodium chloride and sufficient concentrated sulfuric acid to bring the solution to a pH of 6.4. Two grams of methanol was added to the above solution and the resulting mixture was placed in the stirred pressure vessel of Example 1. The vessel was closed and 11 grams of methyl chloride was added through the gas inlet tube. The reaction vessel and contents were heated to 64° C with stirring at 50 revolutions per minute and under a pressure of 82 pounds per square inch (gauge). Heating was continued at temperatures of 64°-66° C for a period of 5 hours, during which the pressure in the reaction vessel gradually diminished to 74 psig. The reaction vessel was then cooled and vented. The product was a clear solution having a viscosity of 600 centipoises at 25° C as determined with a Brookfield viscometer using the No. 5 spindle at 20 rpm. This product was found to contain 6.5 percent by weight of polymer solids and titration of an aliquot thereof showed substantially complete quaternization of the dimethylamino groups. The quaternized polymer had excellent activity in conditioning sewage sludge for dewatering.

When the quaternization reaction was attempted using the same starting polymer and methyl chloride but at a pH of greater than 7.0, the reaction mixture rapidly formed a very viscous gel which resisted stirring and could not be employed as a practical product.

EXAMPLE 3

The procedure of Example 1 is repeated except that 10 grams of tertiary butyl alcohol is substituted for the methanol and 100 grams of ethyl chloride is substituted for the methyl chloride of Example 1 to produce a product consisting of an aqueous solution of acrylamide polymer wherein about 90 percent of the carboxamide groups carry substituents having the formula:

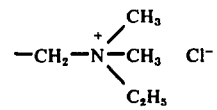

As indicated the quaternary ammonium salts of acrylamide polymers produced in accordance with the present invention are useful at low dosages as flocculants for aqueous suspensions containing organic and/or inorganic suspensoids as, for example, raw sewage, paper mill waste or titanium black liquor. In addition the quaternary products are useful as electroconductive resins for coating paper for reprography and as wet-strength and filler-retention agents in the manufacture of paper.

EXAMPLE 4

142 Grams of a polyacrylamide, as described in Example 1, is dissolved in 568 grams of deionized water and 84 grams of diethyl amine followed by 30 grams of para-formaldehyde are added thereto with stirring. On addition of the formaldehyde an exothermic reaction is initiated and thereafter the reaction mixture is heated at temperatures up to about 40° C for a period of about 3 hours to complete the Mannich reaction whereby about 50 percent of the carboxamide nitrogens in the polyacrylamide carry a diethylaminomethyl group. The resulting solution is placed in a glass reaction vessel equipped with a stirrer, a dropping funnel and a reflux condenser and is acidified with sulfuric acid to a pH of 6. Thirty grams of ethanol and 40 grams of sodium chloride are then dissolved in the above solution and the resulting mixture is heated to 60° C and 83 grams of isobutyl chloride is added thereto dropwise with stirring over a period of 3 hours while maintaining the reaction mixture at temperatures of 60°-65° C under reflux. Titration of the product shows substantial conversion of the diethylamino groups to quaternary isobutyl-diethylammonium chloride groups. The polymer product is useful for the flocculation and flotation of digested sewage sludge.

The acrylamide polymers, employed in preparing the Mannich bases used as starting polymers in the process of the present invention are well known and may be homopolymers of acrylamide or copolymers of acrylamide with up to about 30 mole percent of a compatible water-soluble monomer, such as acrylic or methacrylic acid or their salts. The Mannich bases are generally prepared from an aqueous solution of acrylamide polymer by the addition of formaldehyde and a secondary amine, preferably a dialkyl amine. Dialkyl amines having from 1 to 4 carbon atoms in their alkyl groups may be employed although dimethyl amine or diethyl amine is usually preferred. The formaldehyde and dialkyl amine are usually employed in equimolar proportions to each other or with a slight molar excess of the amine and are employed in an amount to convert the desired proportion of carboxamide groups on the polymer to the dialkylaminomethyl Mannich derivative. Useful quaternary ammonium salts may be prepared from acrylamide polymers having from about 20 to 100 percent of their carboxamide groups so modified.

I claim:

1. In a method for the preparation of a water-soluble polyquaternary-ammonium derivative of an acrylamide polymer wherein an alkylating agent is reacted with an N-dialkylaminomethyl derivative of said acrylamide polymer in an aqueous medium, the improvement which consists of adjusting the aqueous medium to a pH of 6.5 or less and incorporating therein a catalytic amount of an alkanol containing 1 to 4 carbon atoms prior to contacting said medium with the alkylating agent.

2. The method of claim 1 wherein the N-dialkylaminomethyl derivative of the acrylamide polymer is a polyacrylamide on which from 20 to 100 percent of the carboxamide groups carry a dimethylaminomethyl substituent.

3. The method of claim 1 wherein the alkanol is employed in the amount of from about 5 to about 15 percent by weight based on the amount of N-dialkylaminomethyl -acrylamide polymer in the reaction mixture.

4. The method of claim 3 wherein the reaction is carried out at a temperature of from about 40° C to the boiling temperature of the medium.

5. The method of claim 1 wherein the alkylating agent is a primary alkyl chloride containing 1 to 4 carbon atoms.

6. The method of claim 1 wherein the alkylating agent is methyl chloride or ethyl chloride and the reaction is carried out at superatmospheric pressure.

7. The method of claim 2 wherein the alkylating agent is methyl chloride.

8. The method of claim 7 wherein the alkanol is employed in the amount of from about 5 to about 15 percent by weight based on the weight of N-dimethylaminomethyl -acrylamide polymer in the reaction mixture.

9. The method of claim 8 wherein the alkanol is methanol.

* * * * *